(12) United States Patent
Huang et al.

(10) Patent No.: US 9,335,525 B2
(45) Date of Patent: May 10, 2016

(54) OPTICAL LENS, IMAGE-CAPTURING DEVICE AND OPTICAL TOUCH SYSTEM

(71) Applicant: PIXART IMAGING INC., Hsin-Chu (TW)

(72) Inventors: Yu-Hsiang Huang, Hsin-Chu (TW); Chun-Yi Lu, Hsin-Chu (TW); Tzung-Min Su, Hsin-Chu (TW); Chih-Hsin Lin, Hsin-Chu (TW); Jia-Hong Huang, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 440 days.

(21) Appl. No.: 14/040,201

(22) Filed: Sep. 27, 2013

(65) Prior Publication Data
US 2014/0225868 A1 Aug. 14, 2014

(30) Foreign Application Priority Data
Feb. 8, 2013 (TW) .............................. 102105295 A

(51) Int. Cl.
| G06F 3/042 | (2006.01) |
| G02B 13/18 | (2006.01) |
| G02B 19/00 | (2006.01) |

(52) U.S. Cl.
CPC ............ *G02B 13/18* (2013.01); *G02B 19/0014* (2013.01); *G02B 19/0061* (2013.01); *G06F 3/0428* (2013.01)

(58) Field of Classification Search
CPC combination set(s) only.
See application file for complete search history.

(56) References Cited

U.S. PATENT DOCUMENTS

| 2003/0197953 A1* | 10/2003 | Yamaguchi | G02B 9/10 359/717 |
| 2010/0073534 A1* | 3/2010 | Yano | B29D 11/00432 348/294 |
| 2010/0079635 A1* | 4/2010 | Yano | G02B 3/0062 348/294 |
| 2014/0005484 A1* | 1/2014 | Charles | A61B 17/02 600/201 |
| 2015/0018622 A1* | 1/2015 | Tesar | A61B 1/05 600/202 |

FOREIGN PATENT DOCUMENTS

| TW | 201106227 A1 | 2/2011 |
| TW | M414619 U1 | 10/2011 |
| TW | 201241701 A1 | 10/2012 |
| WO | WO 2012/023706 A2 | 2/2012 |

* cited by examiner

*Primary Examiner* — Van Chow
(74) *Attorney, Agent, or Firm* — Li & Cai Intellectual Property (USA) Office

(57) ABSTRACT

An optical lens is configured in front of an image-capturing lens of an image-capturing device. A light-emitting unit of the image-capturing device emits a light beam. The optical lens includes a pair of peripheral compensation portions and a central diverging portion. Each peripheral compensation portion has a first convex surface and a first concave surface arranged opposite to the first convex surface. The central diverging portion is arranged between the peripheral compensation portions, and has a second concave surface and an oppositely arranged light incident surface. The second concave surface is arranged between the first convex surfaces. The light incident surface is arranged between the first concave surfaces. The optical axis of the light beam sequentially aligns with the light incident surface and the second concave surface. The light rays of the light beam pass through the first concave surface and the first convex surface in sequence.

25 Claims, 8 Drawing Sheets

OPTICAL LENS, IMAGE-CAPTURING DEVICE AND OPTICAL TOUCH SYSTEM

BACKGROUND OF THE INVENTION

1. Field of the Invention

The instant disclosure relates to a touch system and the components of the touch system; in particular, to an optical lens and an image-capturing device applied in an optical touch system.

2. Description of Related Art

The existing touch control technology has already developed an optical touch system. The optical touch system commonly includes a plurality of image sensors and a plurality of infrared light emitting diodes (IR LEDs), in which the IR LEDs for example can be complementary metal-oxide semiconductors (CMOS) or charged-coupled devices (CCD).

The optical touch system has a contact plane for an object to make contact with. During the operation of the optical touch system, the IR LEDs emit infrared beams which are transmitted via the contact plane. When an object such as a finger or a stylus touches the contact plane, the object will block a certain number of infrared beams. As a result, shadows are generated on the contact plane. Meanwhile, the image sensors can detect the shadows. The optical touch system can use the shadows to calculate the position of the object on the contact plane and to further provide touch control.

SUMMARY OF THE INVENTION

The object of the instant disclosure is to provide an optical lens used for an optical touch system which has a plurality of image-capturing modules and a plurality of light-emitting units. The optical lens can change the view angle of the image-capturing module and the distribution of the light intensity of the light-emitting unit.

The instant disclosure also discloses an image-capturing device which includes the aforementioned image-capturing modules, light-emitting units, and optical lens.

The instant disclosure also discloses an optical touch system with the application of the aforementioned optical lens.

An embodiment of the instant disclosure discloses an optical lens which can be configured in front of an image-capturing lens of an image-capturing device. A light-emitting unit of the image-capturing device can emit a light beam. The optical lens includes a pair of peripheral compensation portions and a central diverging portion. Each peripheral compensation portion has a first convex surface and a first concave surface arranged opposite to the first convex surface. The central diverging portion is arranged between and connected to the peripheral compensation portions. The central diverging portion has a second concave surface and a light incident surface opposite to the second concave surface. The second concave surface is arranged between the first convex surfaces. The light incident surface is arranged between the first concave surfaces. The optical axis of the light beam sequentially passes through the light incident surface and the second concave surface. The light rays of the light beam pass through the first concave surface and the first convex surface in sequence.

In another embodiment of the instant disclosure, an image-capturing device is disclosed. The image-capturing device includes an image-capturing module, a light-emitting unit, the aforementioned optical lens and a casing. The image-capturing module includes an image-capturing lens. The light-emitting unit is fixed at the image-capturing module and can emit a light beam. The optical axis of the light beam and the optical axis of the image-capturing lens both pass through the light incident surface and the second concave surface in sequence, whereas a plurality of light rays of the light beam passes through the first concave surfaces and the first convex surfaces in sequence. The casing includes a frame and a fixing member. The frame housing the optical lens and exposing the first concave surface, the first convex surfaces, the light incident surface and the second concave surface. The fixing member is connected to the frame and fixing the image-capturing module.

In another embodiment of the instant disclosure, an optical touch system is disclosed. The optical touch system includes a panel, a plurality of the aforementioned image-capturing devices and a processing unit. The panel has a flat surface, and the plurality of image-capturing devices is configured at the periphery of the panel. Each image-capturing module of the image-capturing device can capture at least one image data of an object disposed on the flat surface of the panel to generate a corresponding image signal. The processing unit receives the image signal and generates a coordinate signal corresponding to at least one object.

With the peripheral compensation portions and the central diverging portion, the optical lens of the instant disclosure can be applied to the optical touch system to change the view angle of the image-capturing module. Moreover, the peripheral compensation portions and the central diverging portion can change the traveling direction of the light rays from the light-emitting unit such that the optical lens can change the light intensity distribution of the light-emitting unit.

In order to further understand the instant disclosure, the following embodiments and illustrations are provided. However, the detailed description and drawings are merely illustrative of the disclosure, rather than limiting the scope being defined by the appended claims and equivalents thereof.

DETAILED DESCRIPTION OF THE PREFERRED EMBODIMENTS

Figure 1A:
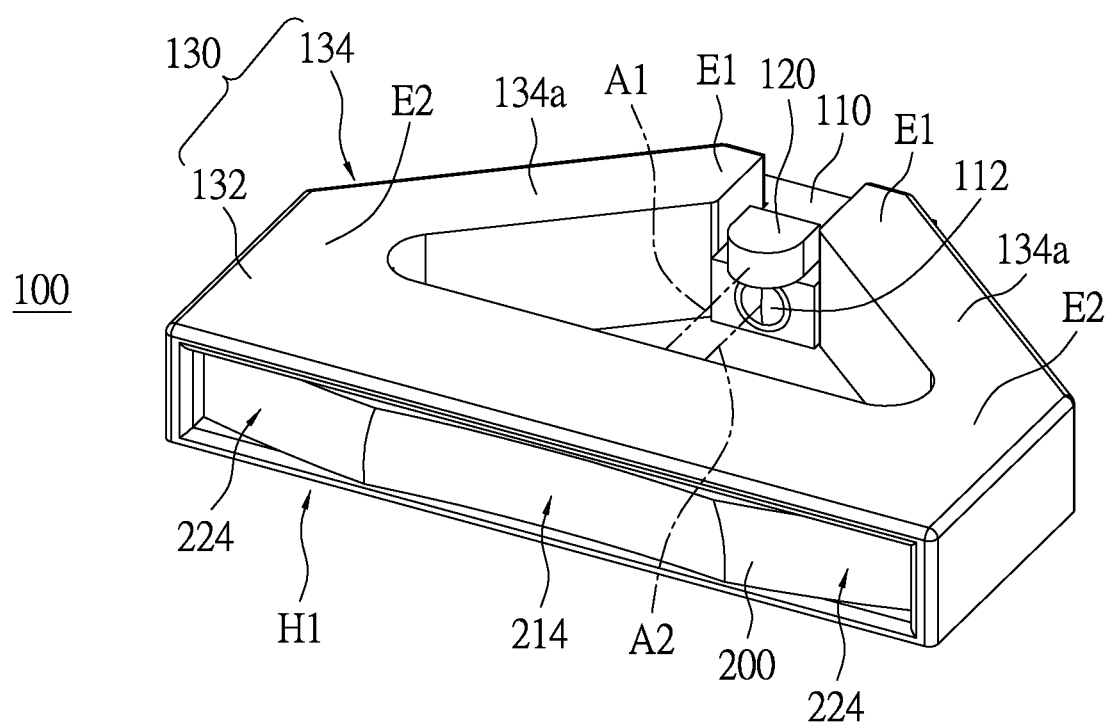
FIG. 1A is a perspective view of the image-capturing device illustrating an embodiment according to the instant disclosure.
Figure 1B:
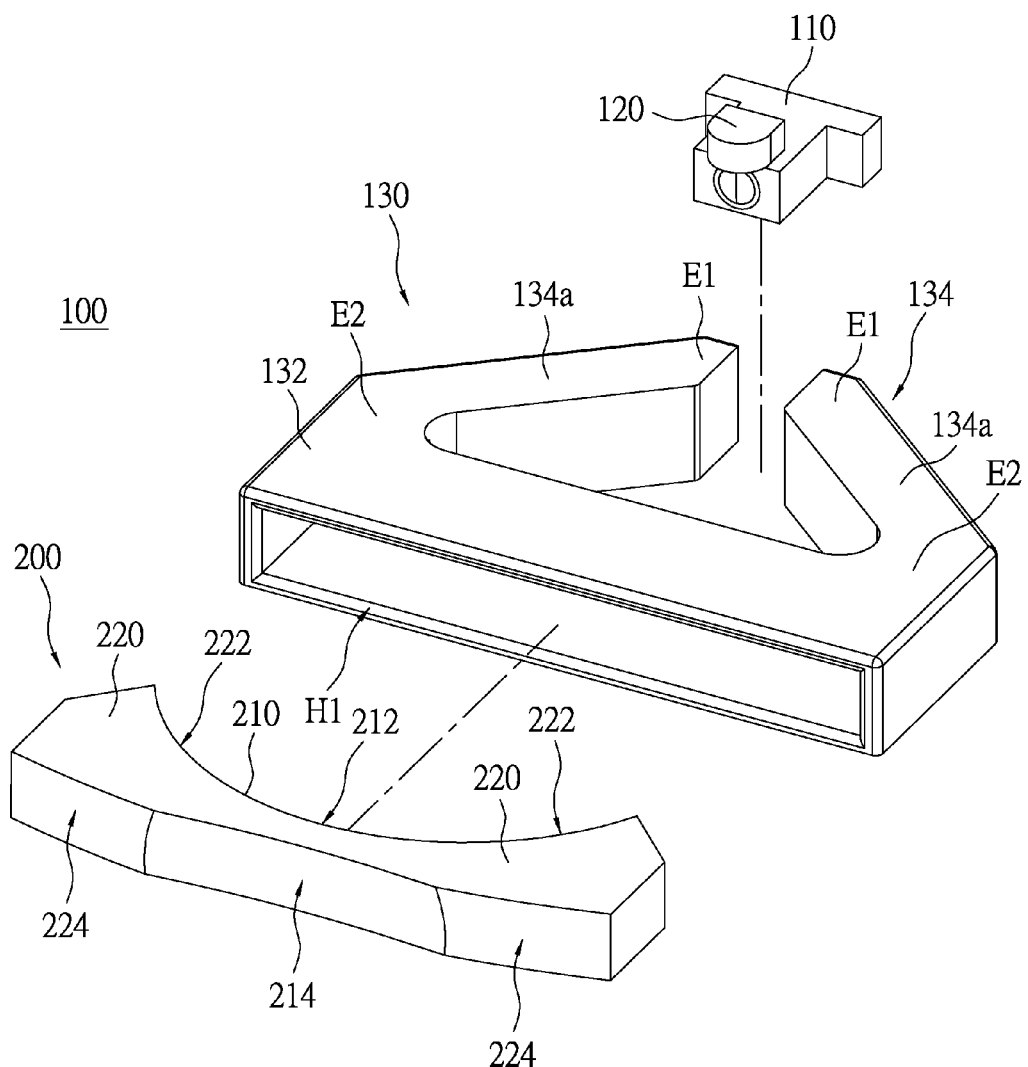
FIG. 1B is an exploded view of the image-capturing device as illustrated in FIG. 1A.

FIG. 1A is a perspective view of an image-capturing device 100 illustrating an embodiment according to the instant disclosure, and FIG. 1B is an exploded view of the image-capturing device 100 as illustrated in FIG. 1A. Please refer to FIGS. 1A and 1B. The image-capturing device 100 has a wide range of application such as for an optical touch system. The image-capturing device 100 can emit a light beam and capture at least one image data of an object. The object may be a finger or a stylus which operates the optical touch system, and the image data can be shadows created by the object blocking part of the light beam.

The image-capturing device 100 includes an image-capturing module 110, a light-emitting unit 120, an optical lens 200 and a casing 130. The image-capturing module 110 includes an image-capturing lens 112 with an image sensor such as a CMOS or a CCD. Thus, the image-capturing module 110 can receive light rays from the image-capturing lens 112 and capture images.

The light-emitting unit 120 is fixed at the image-capturing module 110. For example, the light-emitting unit 120 can be coupled and fixed onto the image-capturing module 110 via adhesion, screwing, or fastening mechanisms. The light-emitting unit 120 may be a light emitting diode (LED) which emits light rays such as invisible light (for example: infrared light). Thus, the light-emitting unit 120 can be an infrared LED. Moreover, light rays emitted from the light-emitting unit 120 may also be visible light.

The optical lens 200 and the image-capturing module 110 are both coupled to the casing 130 such that the optical lens 200, the image-capturing module 110, and the casing 130 are combined together. The casing 130 may include a frame 132 and a fixing member 134. The frame 132 houses the optical lens 200. In other words, the optical lens 200 is disposed in the frame 132. The fixing member 134 is connected to the frame 132 and fixes the image-capturing module 110. For example, the fixing member 134 may be incorporated with the frame 132. The casing 130 can be made of materials such as plastic, metal, or ceramic. The fixing member 134 and the frame 132 can be integrally formed. For example, the casing 130 can be formed by mold-injection, machine-stamping or extrusion. Via the casing 130, the optical lens 200 can be configured in front of the image-capturing lens 112 such that the image-capturing lens 112 can capture images from the optical lens 200.

The optical lens 200 includes a central diverging portion 210 and a pair of peripheral compensation portions 220. The central diverging portion 210 is arranged between and connected to the peripheral compensation portions 220. Each of the peripheral compensation portions 220 has a first convex surface 224 and a first concave surface 222 arranged opposite to the first convex surface 224. The central diverging portion 210 has a second concave surface 214 and a light incident surface 212 arranged opposite to the second concave surface 214. Moreover, the second concave surface 214 of the central diverging portion 210 is arranged between the first convex surfaces 224 of the peripheral compensation portions 220, and the light incident surface 212 of the central diverging portion 210 is arranged between the first concave surfaces 222 of the peripheral compensation portions 220. Besides, the second concave surface 214 may be connected to the first convex surfaces 224, whereas the light incident surface 212 may be connected to the first concave surfaces 222.

The light incident surface 212 of the central diverging portion 210 may be a flat surface or a concave surface. The curvature of the light incident surface 212 may be larger than the curvature of the second concave surface 214. That is, the degree of the light incident surface 212 curving may be larger than the degree of the first convex surface 224 curving. The curvature of the first convex surface 224 may be smaller than the curvature of the first concave surface 222 in the same peripheral compensation portion 220. In other words, the curvature of the first concave surface 222 may be larger than the curvature of the first convex surface 224.

Due to both the first concave surfaces 222 and the first convex surfaces 224 of the peripheral compensation portions 220 and both the light incident surface 212 and the second concave surface 214 of the central diverging portion 210, each the peripheral compensation portion 220 has a first focal length, and the central diverging portion 210 has a second focal length. The first focal length and the second focal length are less than zero. In other words, the first and second focal lengths are negative values. Thus, the optical lens 200 facilitates the light beam to spread and to travel towards the second concave surface 214.

The fixing member 134 of the casing 130 in the instant embodiment may also include a pair of fixing strips 134a. The image-capture module 110 is fixed between the fixing strips 134a. Specifically, each fixing strip 134a has a fixing end E1 and a coupling end E2 opposite to the fixing end E1. The coupling end E2 is connected to the frame 132. The image-capturing module 110 is fixed between the fixing ends E1. The fixing ends E1 can directly clamp the image-capturing module 110. Alternatively, the fixing ends E1 can be coupled to the image-capturing module 110 via adhesives.

Figure 1C:
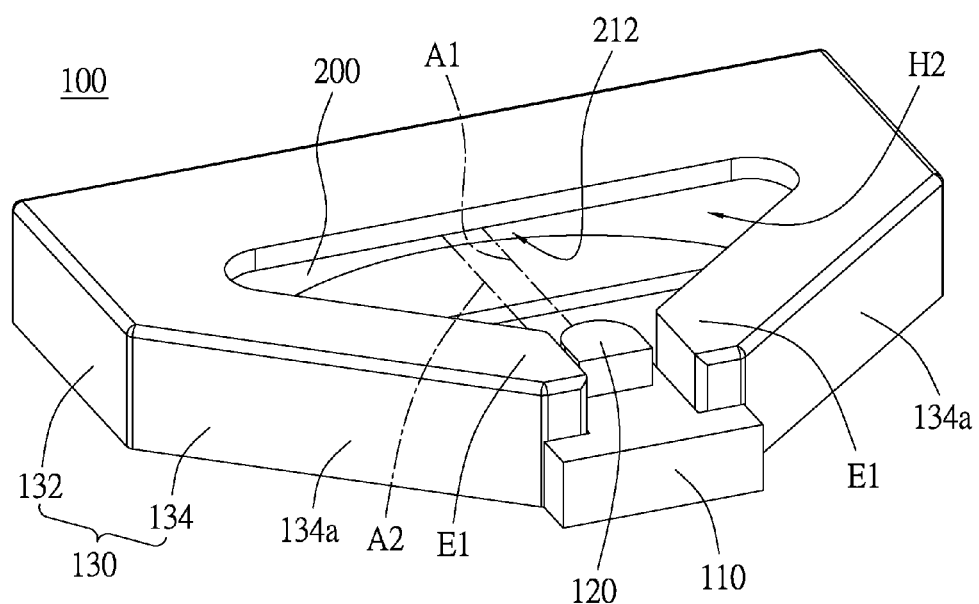
FIG. 1C is another perspective view of the image-capturing device as illustrated in FIG. 1A.

FIG. 1C is another perspective view of the image-capturing device 100 as illustrated in FIG. 1A. Please refer to FIGS. 1B and 1C. The frame 132 exposes the surfaces of the optical lens 200, and the surfaces are the first concave surfaces 222, light incident surface 212, first convex surfaces 224, and the second concave surface 214. Specifically, the frame 132 has a light exiting opening H1 and a corresponding light entering opening H2. The light exiting opening H1 and the light entering opening H2 expose the surfaces of the optical lens 200. Namely, the light exiting opening H1 exposes the first convex surfaces 224 and the second concave surface 214, whereas the light entering opening H2 exposes the first concave surfaces 222 and the light incident surface 212.

Please refer to FIGS. 1A and 1C. The light entering opening H2 is arranged between the coupling ends E2. The fixing strips 134a extend from the periphery of the light entering opening H2. The light-emitting unit 120 has an optical axis A1. The image-capturing lens 112 of the image-capturing module 110 has an optical axis A2. As illustrated in FIGS. 1A and 1C, the optical axis A1 and the optical axis A2 are substantially parallel. Thus, the optical axis A1 and the optical axis A2 are substantially in the same plane. In the preferred embodiment, the plane, in which both of the optical axes A1 and A2 are in, can be normal to the horizontal plane. Moreover, the optical axis A1 and optical axis A2 both pass through the light incident surface 212 and the second concave surface 214 in sequence.

Furthermore, each fixing strip 134a can extend in a direction neither parallel nor normal to the optical axes A1 and A2. The extending direction of the fixing strip 134a represents the alignment thereof. In order words, the path in which the fixing end E1 and the coupling end E2 of the fixing strip 134a interconnect is substantially the extending direction. Thus, based on the appearance of the image-capturing module 110, the fixing strips 134a are neither parallel nor normal to the optical axes A1 and A2. Moreover, the fixing strips 134a are not parallel to one another.

Figure 2:
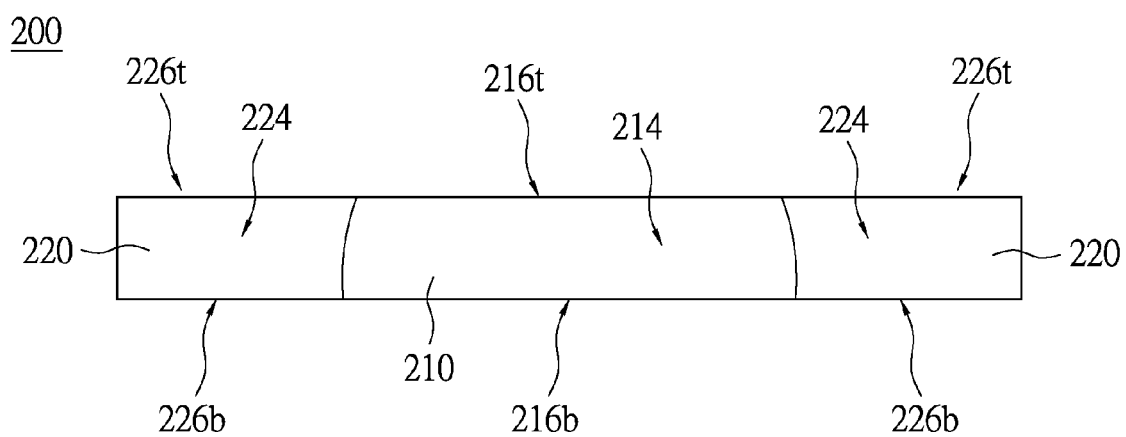
FIG. 2 is a front view of the optical lens as illustrated in FIG. 1B.

Please refer to FIGS. 1B and 2. FIG. 2 is a front view of the optical lens 200 as illustrated in FIG. 1B. Each of the peripheral compensation portions 220 further has a first top flat surface 226t and a first bottom flat surface 226b. The central diverging portion 210 further has a second top flat surface 216t and a second bottom flat surface 216b. As illustrated in FIGS. 1B and 2, within the same peripheral compensation portion 220, the first convex surface 224 and the first concave surface 222 are arranged between the first top flat surface 226t and the first bottom flat surface 226b. Within the central diverging portion 210, the second concave surface 214 and the light incident surface 212 are arranged between the second top flat surface 216t and the second bottom flat surface 216b.

As illustrated in FIGS. 1B and 2, two opposite flat surfaces of the peripheral compensation portions 220 are co-planar with two opposite flat surfaces of the central diverging portion 210 respectively. Specifically, the first top flat surfaces 226t of the peripheral compensation portions 220 and the second top flat surfaces 216t of the central diverging portion 210 are co-planar. The first bottom flat surfaces 226b of the peripheral compensation portions 220 and the second bottom flat surfaces 216b of the central diverging portion 210 are co-planar such that the optical lens 200 resembles a flat plane.

Figure 3A:
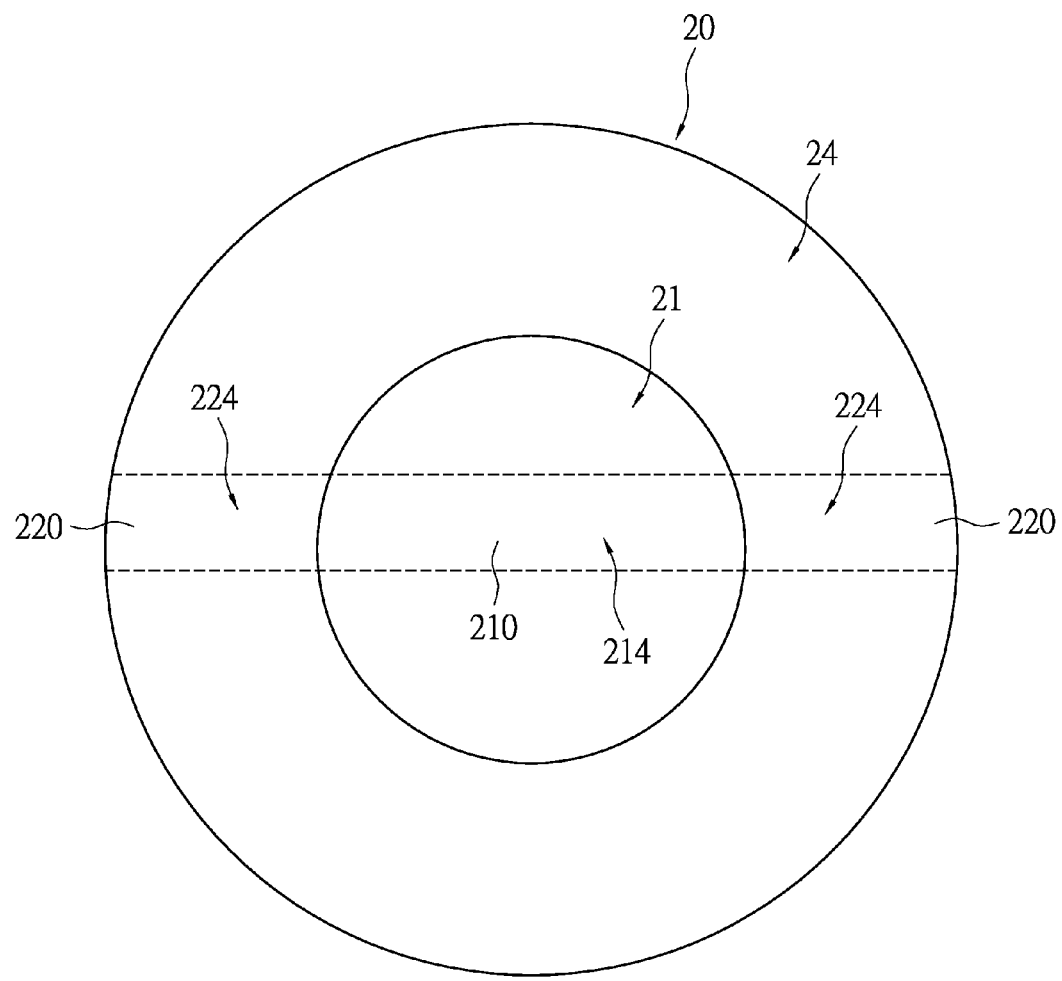
FIG. 3A is a front view illustrating the lens which is used to make the optical lens in FIG. 2.
Figure 3B:
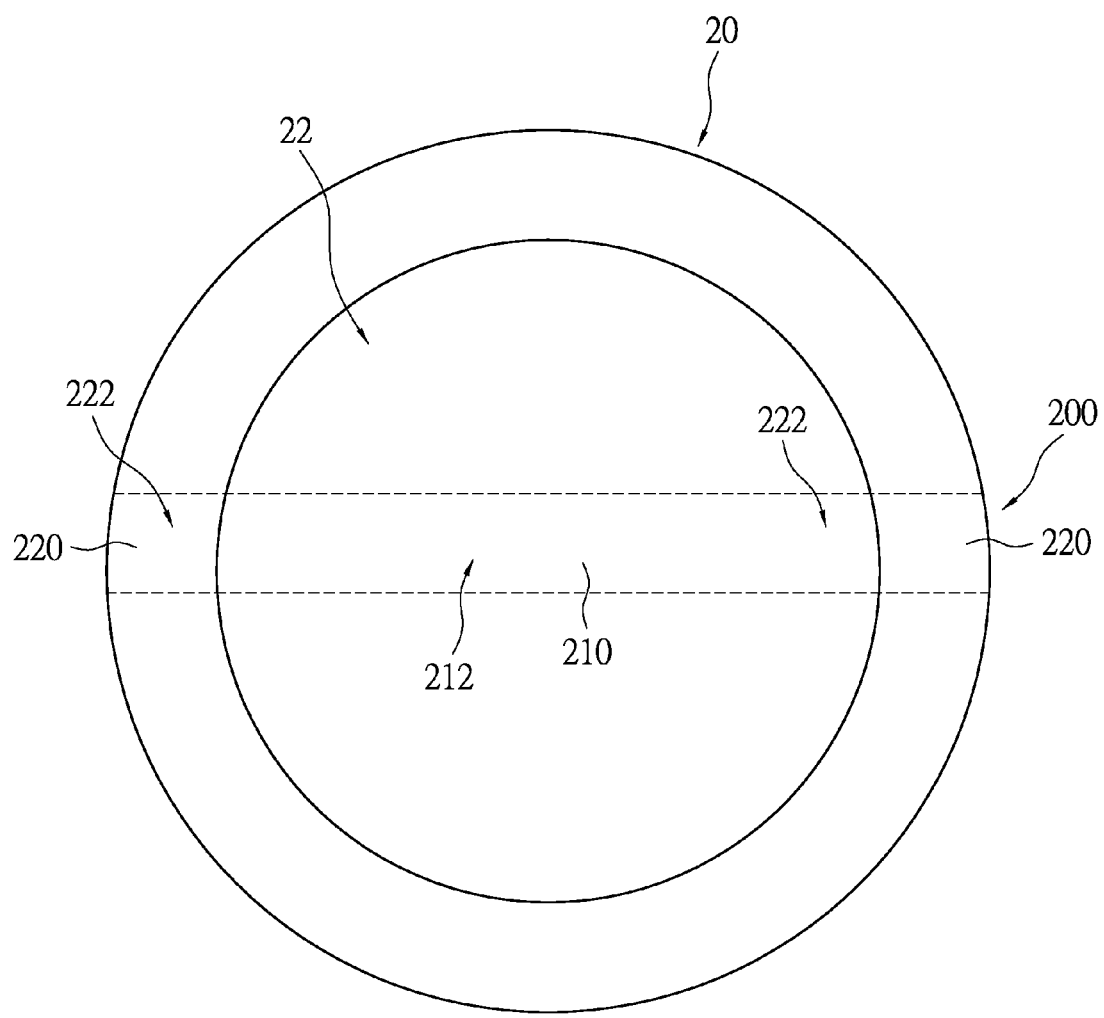
FIG. 3B is a rear view of the lens as illustrated in FIG. 3A.

FIG. 3A is a front view illustrating the lens which is used to make the optical lens in FIG. 2. FIG. 3B is a rear view of the lens as illustrated in FIG. 3A. Please refer to FIGS. 3A and 3B. The optical lens 200 can be formed by cutting the lens 20. The lens 20 can be made with glass or transparent plastic material. The lens 20 has two inner concave surfaces 21, 22 and an outer convex surface 24. The two inner concave surfaces 21, 22 opposite to each other. The outer convex surface 24 is an annularly curved surface which flanks and connected to the inner concave surface 21. Moreover, the inner concave surfaces 21, 22 can be quadric surfaces such as parabolic, spherical, spheroidal or hyperboloidal surfaces.

The optical lens 200 can be made by cutting the lens 20 along the two dotted lines as shown in FIGS. 3A and 3B. After cutting along the dotted lines, the lens 20 is correspondingly formed with the first top flat surface 226t and the second top flat surface 216t along one of the dotted lines, and the lens 20 is correspondingly formed with the first bottom flat surface 226b and the second bottom flat surface 216b along the other dotted line (Please refer to FIG. 2). Moreover, the dotted lines are straight lines as shown in FIGS. 3A and 3B. Thus, after the lens has been cut, the first top flat surface 226t and the second top flat surface 216t are flush with each other, and the first bottom flat surface 226b and the second bottom flat surface 216b are flush with each other.

After the cutting of the lens 20, three portions are defined, and the middle portion of the lens 20 is retained as the optical lens 200 (not labeled in FIGS. 3A and 3B). A portion of the inner concave surface 21 is formed as the second concave surface 214 of the central diverging portion 210, portions of the outer convex surface 24 are formed as the first convex surfaces 224 of the peripheral compensation portions 220, and portions of the inner concave surface 22 are formed as the light incident surface 212 of the central diverging portion 210 and the first concave surface 222 of the peripheral compensation portions 220. Thus, the first convex surfaces 224 are arranged on the same convex surface 24 and the first concave surfaces 222 and the light incident surface 212 are arranged on the same concave surface 22 as shown in FIGS. 3A and 3B.

Figure 4:
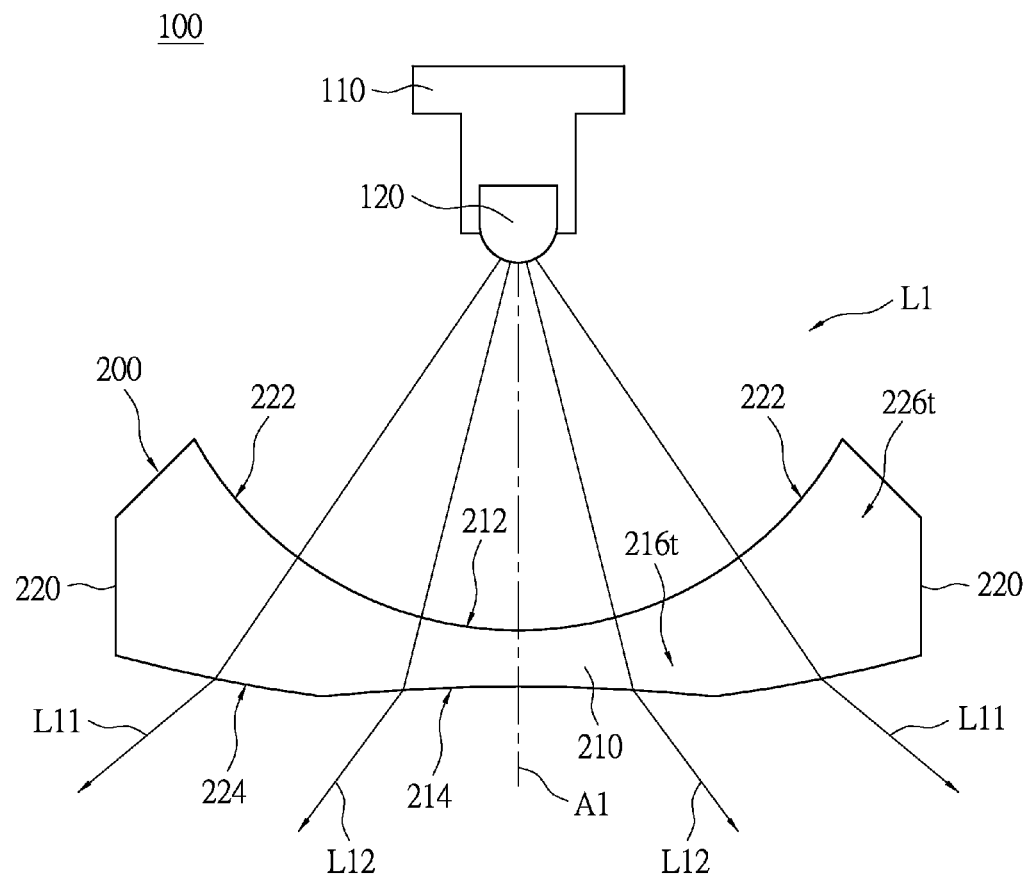
FIG. 4 is a top view of the image-capturing device as illustrated in FIG. 1A after the disassembly of the casing.

FIG. 4 is a top view of the image-capturing device as illustrated in FIG. 1A after the disassembly of the casing. Please refer to FIG. 4A, the light-emitting unit 120 can emit a light beam L1. The optical axis of the light beam L1 is substantially the same as the optical axis A1 of the light-emitting unit 120. The light beam L1 has a plurality of light rays L11 and L12 (L11 and L12 are only example light rays which demonstrates the traveling path of the light rays emitted from the light-emitting unit, but are not limited to only two light rays L11 and L12). When the light-emitting unit 120 emits the light beam L1, the light ray L11 sequentially passes through the first concave surface 222 and then the first convex surface 224, and the light ray L12 sequentially passes through the light incident surface 212 and then the second concave surface 214.

Since the peripheral compensation portions 220 has the negative valued first focal length and the central diverging portion 210 also has the negative valued second focal length, the peripheral compensation portions 220 and the central diverging portion 210 can spread the light beam L1. In other words, the peripheral compensation portions 220 and the central diverging portion 210 can deviate the traveling directions of the light rays L11 and L12 from the optical axis A1. Moreover, the absolute value of the first focal length of the peripheral compensation portions 220 can be larger than the absolute value of the second focal length of the central diverging portion 210.

Since the peripheral compensation portions 220 and the central diverging portion 210 can deviate the traveling directions of the light rays L11 and L12 from the optical axis A1, the optical lens 200 can spread the light beam L1 such that the spread angle of the light beam L1 is increased. As a result, the optical lens 200 can reduce the light intensity of the light beam L1 along the optical axis A1 and regions proximate to the optical axis A1. The optical lens 200 can also increase the light intensity of the light beam L1 regions distal to the optical axis A1 such that the light intensity of the light beam L1 can be distributed relatively uniform.

Furthermore, the optical axis A2 of the image-capturing lens 112 (please refer to FIGS. 1A and 1C) and the optical axis A1 are substantially parallel. The optical axes A1 and A2 both pass through the light incident surface 212 and the second concave surface 214 in sequence. Therefore, according to the principle of optical reversibility, the optical lens 200 can increase the view angle of the image-capturing lens 112 such that the image-capturing lens 112 may have a relatively larger view angle for capturing images, and further increase the field of view (FOV) of the image-capturing lens 112.

Notably, FIG. 4 is a top view of the image-capturing device 100 (after the disassembly of the casing 130), which is to view the image-capturing device 100 from angle above and normal to the horizontal plane. As a result, the first top flat surface 226t and the second top flat surface 216t are substantially parallel with the horizontal plane. In the instant embodiment, the common plane in which the optical axis A1 of the light-emitting unit 120 and the optical axis A2 of the image-capturing lens 112 reside is normal to the horizontal plane. In the image-capturing device 100 as shown in FIG. 4, the optical axis A1 almost completely overlaps the optical axis A2 viewing from the top. Thus, the origin and direction of the optical axis A1 is identical to the optical axis A2 of the same as shown in FIG. 4.

Moreover, based on the various possibilities of surface designs (for example: surfaces of different curvatures and/or surfaces of different shapes, such as parabolic, spherical, spheroidal, or hyperboloidal, of the first concave surfaces 222, first convex surfaces 224, light incident surface 212 and/or the second concave surface 214) for the first concave surface 222, first convex surface 224, the light incident surface 212 and the second concave surface 214, the optical lens 200 can change the distribution of light intensity of the light beam L1 and the view angle of the image-capturing lens 112. Thus, the preferred distribution of light intensity of the light beam L1 and the field of view of the image-capturing lens 112 are provided such that various optical needs can be satisfied.

Figure 5:
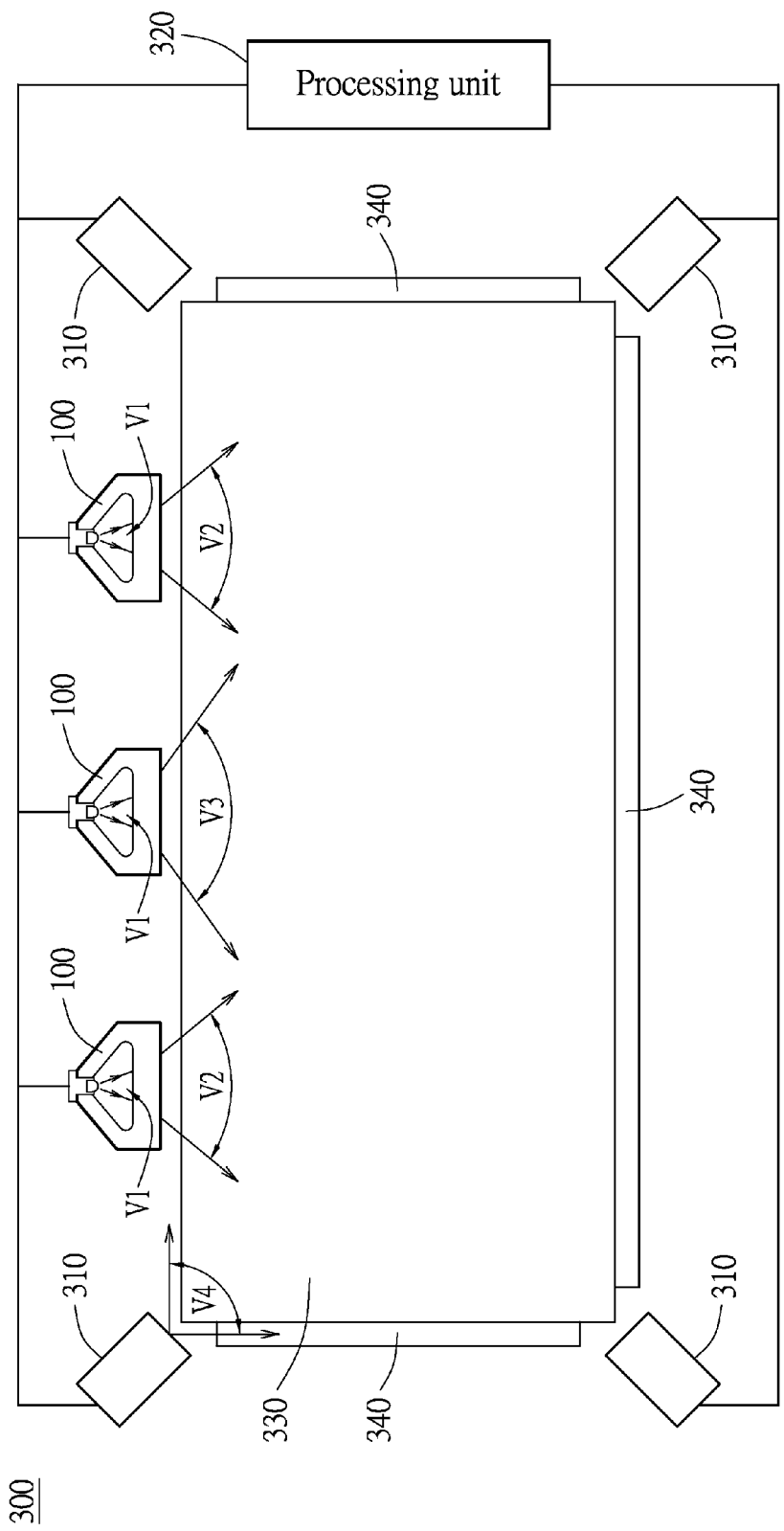
FIG. 5 is a top view of the optical touch system illustrating an embodiment of the instant disclosure.

FIG. 5 is a top view of the optical touch system illustrating an embodiment of the instant disclosure. Please refer to FIG. 5, the optical touch system 300 includes a panel 330, a plurality of the aforementioned image-capturing devices 100, a plurality of initial image-capturing devices 310, a processing unit 320 and a plurality of reflective strips 340. The panel 330 has a flat surface which can be viewed from above the panel 330 as shown in FIG. 5. In other words, FIG. 5 shows the flat surface of the panel 330. The panel 330 can be a display panel, a transparent board (for example: glass board or plastic board), or opaque board. The display panel can be a liquid crystal display panel (LCD panel), and the optical touch system 300 can be used as a touch display screen or a touch pad without any screen display functionality.

The panel 330 is substantially a rectangular shaped panel, and the flat surface of the panel 330 can resemble a rectangular such that the flat surface of the panel 330 has four straight edges. The image-capturing device 100 and the initial image-capturing devices 310 are arranged on the periphery of the panel, and the reflective strips 340 are arranged on the straight edges.

In FIG. 5, the total quantity of the image-capturing devices 100 and the initial image-capturing devices 310 of optical touch system 300 totals to seven. Four initial image-capturing devices 310 are respectively configured at four corners of the flat surface of the panel 330, and three image-capturing devices 100 are configured at one of the straight edges. In other words, two initial image-capturing devices 310 and three image-capturing devices 100 are configured at the same edge.

The initial image-capturing device 310 is substantially an image-capturing device 100 before the assembly of the optical lens 200 and the casing 130. Thus, the initial image-capturing devices 310 may include the image-capturing module 110 and the light-emitting unit 120, but not include the optical lens 200 and the casing 130. However, although the initial image-capturing device 310 may not include the optical lens 200, the initial image-capturing device 310 can also include other types of optical elements different from the optical lens 200. When the optical touch system 300 is in operation, the initial image-capturing device 310 and the image-capturing device 100 emit the light beam L1 (not drawn in FIG. 5, please refer to FIG. 4). The light beam L1 is transmitted via the flat surface of the panel 330 and reflected by the reflective strips 340. When a finger, a stylus or a similar object touches the panel 330, a part of the light beam L1 will be blocked, and shadows are formed on the bezel (such as the reflective strips 340) of the panel 330

At the same time, the initial image-capturing device 310 and the image-capturing module 110 of the image-capturing device 100 will capture image data of the objects (not shown in FIG. 5), which is the images of the shadows. Then, image signals corresponding to the images of the shadows are generated. The processing unit 320 receives the image signals generated by both the initial image-capturing devices 310 and the image-capturing devices 100. Then, the processing unit 320 generates corresponding coordinate signals in order to provide touch function. Moreover, the processing unit 320 can be a microcontroller or a central processing unit (CPU).

The image-capturing module 110 of the image-capturing device 100 has a first view angle V1, and the initial image-capturing device 310 has an initial view angle V4. Since the initial image-capturing device 310 may be the image-capturing device 100 without assembly of the optical lens 200 and the casing 130, the initial view angle V4 is equal to the first view angle V1. The optical lens 200 can change the spread angle of the light beam L1 and the initial view angle of the image-capturing lens 112 (please refer to FIG. 4). Thus, the optical lens 200 can change the first view angle V1 such that the field of view of the initial image-capturing device 310 is different from the field of view of the image-capturing device 100.

Since the initial image-capturing device 310 and the image-capturing device 100 have different field of views, the overall field of view coverage of all the initial image-capturing devices 310 and the image-capturing devices 100 can be enhanced. In other words, the range, where a finger, stylus, or similar object is detected on the flat surface of the panel 330 by all of the initial image-capturing devices 310 and the image-capturing devices 100, is enhanced. As a result, the touch control quality of the optical touch system 300 is enhanced.

Moreover, with various designs of the first concave surfaces 222, the first convex surface 224, the light incident surface 212 and the second concave surface 214, the optical lens 200 can change the light intensity distribution of the light beam L1 and the field of view of the image-capturing lens 112. Thus, by using two optical lenses 200 of different designs, the optical touch system 300 has the image-capturing device 100 with two or more various field of views in order to be compatible with optical touch systems of various types or standards. As a result, the design of at least two optical lenses of the image-capturing devices 100 may be different such that the fields of view of the two image-capturing devices 100 are different.

Taking FIG. 5 as an example, the design of all the optical lens 200 of the optical touch system 300 is not necessarily the same. The optical lens 200 can change the first view angle V1 to the second view angle V2 (illustrated as the image-capturing devices 100 on the left and right in FIG. 5), and other optical lenses 200 can change the first view angle V1 to the third view angle V3 (illustrated as the center image-capturing device 100 in FIG. 5). The second view angle V2 and the third view angle V3 are substantially larger than the first view angle V1. The second view angle V2 is not equal to the third view angle V3. Thus, by using at least two optical lenses 200 of different designs, the image-capturing device 100 can have various view angles and be compatible with optical touch systems of various types or standards.

Please refer to the optical touch system 300 as shown in FIG. 5. The total quantity of the image-capturing device 100 and the initial image-capturing device 310 totals to seven, in which four being the initial image-capturing devices 310, and three being the image-capturing devices 100. However, in other embodiments, the total quantity of the image-capturing device 100 and the initial image-capturing device 310 can be totaled from two to six, or more than seven.

Moreover, the image-capturing device 100 can only be one such that the optical lens 200 can only be one. The initial image-capturing device 310 can be one or more than one. Furthermore, the optical touch system 300 can only include image-capturing device 100 or devices 100 and not include any initial image-capturing device 310. In other words, all of the image-capturing devices 100 of the optical touch system 300 include the optical lenses 200. The quantity and configuration of the image-capturing devices 100 and the initial image-capturing devices 310 of the optical touch system 300 are only exemplary and are not limited hereto.

In summary, the optical lens of the instant disclosure can change the view angle of the image-capturing device which can be applied to the optical touch system. Thus, the optical touch system can apply the aforementioned lens to change the field of view of the image-capturing device in order to enhance the overall detectable range for objects of all image-capturing devices. As a result, the touch control quality of the optical touch system can be further enhanced. Moreover, the optical lens of the instant disclosure can also change the light intensity distribution of the light-emitting unit such that the light intensity of the light beam which is emitted from the light-emitting unit can be distributed relatively even, and the probability of overexposure or underexposure is reduced.

The figures and descriptions supra set forth illustrated the preferred embodiments of the instant disclosure; however, the characteristics of the instant disclosure are by no means restricted thereto. All changes, alternations, combinations or modifications conveniently considered by those skilled in the art are deemed to be encompassed within the scope of the instant disclosure delineated by the following claims.

What is claimed is:

1. An optical lens used for configuring in front of an image-capturing lens of an image-capturing device, which includes a light-emitting unit used for emitting a light beam, the optical lens comprising:
    a pair of peripheral compensation portions each having a first convex surface and a first concave surface arranged opposite to the first convex surface; and
    a central diverging portion arranged between and connected to the peripheral compensation portions, the central diverging portion having a second concave surface and a light incident surface arranged opposite to the second concave surface, the second concave surface arranged between the first convex surfaces, the light incident surface arranged between the first concave surfaces, wherein the optical axis of the light beam sequentially passes through the light incident surface and the second concave surface, and a plurality of light rays of the light beam passes through the first concave surfaces and the first convex surfaces in sequence.

2. The optical lens as recited in claim 1, wherein the peripheral compensation portions each further has a first top flat surface and a first bottom flat surface, the first convex surface and the first concave surface are arranged between the first top flat surface and the first bottom flat surface, the central diverging portion further has a second top flat surface and a second bottom flat surface, and the second concave surface and the light incident surface are arranged between the second top flat surface and the second bottom flat surface.

3. The optical lens as recited in claim 2, wherein the first top flat surface and the second top flat surface are co-planar surfaces, and the first bottom flat surface and the second bottom flat surface are co-planar surfaces.

4. The optical lens as recited in claim 1, wherein the light incident surface is a concave surface.

5. The optical lens as recited in claim 4, wherein the curvature of the light incident surface is larger than the curvature of the second concave surface.

6. The optical lens as recited in claim 1, wherein the curvature of the first convex surface is smaller than the first concave surface.

7. The optical lens as recited in claim 1, wherein each of the peripheral compensation portions has a first focal length, and the central diverging portion has a second focal length, wherein the first focal length and the second focal length are less than zero, and the absolute value of the first focal length is larger than the absolute value of the second focal length.

8. The optical lens as recited in claim 1, wherein the optical lens facilitates the light beam to spread and to travel towards the second concave surface.

9. The optical lens as recited in claim 1, wherein the first convex surfaces are arranged on the same convex surface, and the first concave surfaces are arranged on the same concave surface.

10. The optical lens as recited in claim 1, wherein the peripheral compensation portions and the central diverging portion are integrally formed.

11. An image-capturing device, comprising:
    an image-capturing module comprising an image-capturing lens;
    a light-emitting unit fixed at the image-capturing module and emitting a light beam;
    an optical lens, comprising:
        a pair of peripheral compensation portions each having a first convex surface and a first concave surface arranged opposite to the first convex surface; and
        a central diverging portion arranged between and connected to the peripheral compensation portions, the central diverging portion having a second concave surface and a light incident surface arranged opposite to the second concave surface, the second concave surface arranged between the first convex surfaces, the light incident surface arranged between the first concave surfaces, wherein the optical axis of the light beam and the optical axis of the image-capturing lens both pass through the light incident surface and the second concave surface in sequence, and a plurality of light rays of the light beam passes through the first concave surfaces and the first convex surfaces in sequence; and
    a casing, comprising:
        a frame housing the optical lens and exposing the first concave surfaces, the first convex surfaces, the light incident surface and the second concave surface; and
        a fixing member connected to the frame and fixing the image-capturing module.

12. The image-capturing module as recited in claim 11, wherein the fixing member comprises a pair of fixing strips, and the image-capturing module is fixed between the fixing strips.

13. The image-capturing module as recited in claim 11, wherein each of the fixing strips has a fixing end and a coupling end opposite to the fixing end, the coupling end connected to the frame, and the image-capturing module is fixed between the fixing ends.

14. The image-capturing module as recited in claim 13, wherein the frame has a light entering opening and a light exiting opening corresponding to the light entering opening, the light entering opening arranged between the coupling ends exposes the first concave surfaces and the light incident surface, whereas the light exiting opening exposes the first convex surfaces and the second concave surface.

15. The image-capturing module as recited in claim 12, wherein each of the fixing strips extends in a direction neither parallel nor normal to the optical axis of the light beam.

16. An optical touch system, comprising:
    a panel having a flat surface;
    a plurality of image-capturing devices configured at the periphery of the panel, each comprising;
        an image-capturing module comprising an image-capturing lens for capturing at least one image data of an object disposed on the flat surface to generate a corresponding image signal;
        a light-emitting unit fixed at the image-capturing module and emitting a light beam;
        an optical lens, comprising;
            a pair of peripheral compensation portions each having a first convex surface and a first concave surface arranged opposite to the first convex surface; and
            a central diverging portion arranged between and connected to the peripheral compensation portions, the central diverging portion having a second concave surface and a light incident surface arranged opposite to the second concave surface, the second concave surface arranged between the first convex surfaces, the light incident surface arranged between the first concave surfaces, wherein the optical axis of the light beam and the optical axis of the image-capturing lens both passes through the light incident surface and the second concave surface in sequence, and a plurality of light rays of the light beam passes through the first concave surfaces and the first convex surfaces in sequence; and a processing unit receiving the image signal and generating a coordinate signal corresponding to at least one object.

17. The optical touch system as recited in claim 16, wherein the shape of the flat surface is substantially rectangle and at least two of the image-capturing devices are configured at least two corners of the flat surface respectively.

18. The optical touch system as recited in claim 17, wherein the flat surface has a straight edge and at least three of the image-capturing devices are configured at the straight edge.

19. The optical touch system as recited in claim 16, wherein the panel is a display panel.

20. The optical touch system as recited in claim 16, wherein the panel is an opaque panel.

21. The optical touch system as recited in claim 16, wherein the image-capturing module has a first view angle, the optical lens of one of the image-capturing devices changes the first view angle to a second view angle, the optical lens of another one of the image-capturing devices changes the first view angle to a third view angle, wherein the second view angle and the third view angle are larger than the first view angle, and the second view angle is not equal to the third view angle.

22. An optical touch system, comprising:
a panel having a flat surface;
at least one initial image-capturing device configured at the periphery of the panel;
at least one image-capturing device configured at the periphery of the panel, comprising;
 an image-capturing module comprising an image-capturing lens for capturing at least one image data of an object disposed on the flat surface to generate a corresponding image signal, wherein the image-capturing module has a first view angle;
 a light-emitting unit fixed at the image-capturing module and emitting a light beam;
 an optical lens changing the first view angle and comprising;
  a pair of peripheral compensation portions each having a first convex surface and a first concave surface arranged opposite to the first convex surface; and
  a central diverging portion arranged between and connected to the peripheral compensation portions, the central diverging portion having a second concave surface and a light incident surface arranged opposite to the second concave surface, the second concave surface arranged between the first convex surfaces, the light incident surface arranged between the first concave surfaces, wherein the optical axis of the light beam and the optical axis of the image-capturing lens both pass through the light incident surface and the second concave surface in sequence, and a plurality of light rays of the light beam passes through the first concave surfaces and the first convex surfaces in sequence.

23. The optical touch system as recited in claim 22, wherein the initial image-capturing device has an initial view angle which is equivalent to the first view angle.

24. The optical touch system as recited in claim 22, wherein the quantity of the image-capturing device is multiple, and the plurality of image-capturing devices is configured at the periphery of the panel.

25. The optical touch system as recited in claim 24, wherein the optical lens of one of the image-capturing devices changes the first view angle to a second view angle, the optical lens of another image-capturing device changes the first view angle to a third view angle, the second view angle and the third view angle are larger than the first view angle, and the second view angle is not equal to the third view angle.

* * * * *